United States Patent [19]
Sabol

[11] 3,929,305
[45] Dec. 30, 1975

[54] HEAT EXCHANGER SYSTEM AND METHOD

[75] Inventor: Alexander P. Sabol, Williamsburg, Va.

[73] Assignee: The United States of America as represented by the United States National Aeronautics and Space Administration Office of General Counsel-Code GP, Washington, D.C.

[22] Filed: Nov. 27, 1973

[21] Appl. No.: 419,319

Related U.S. Application Data

[62] Division of Ser. No. 301,419, Oct. 27, 1972, abandoned.

[52] U.S. Cl............. 244/117 A; 165/105; 165/106; 237/60; 417/209; 244/135 R
[51] Int. Cl........................ B64d 37/34; B64c 1/00
[58] Field of Search ............. 165/105, 106; 237/60; 244/117 A, 135 R

[56] References Cited
UNITED STATES PATENTS

| | | | |
|---|---|---|---|
| 1,094,231 | 4/1914 | Mennesson | 237/60 X |
| 2,170,225 | 8/1939 | Unge | 237/60 |
| 2,930,553 | 3/1960 | Greenough | 244/117 A X |
| 2,979,293 | 4/1961 | Mount | 244/117 A |
| 3,052,431 | 9/1962 | Compton | 244/117 A |
| 3,129,754 | 4/1964 | Menzel | 244/117 A X |

FOREIGN PATENTS OR APPLICATIONS

| | | | |
|---|---|---|---|
| 122,900 | 10/1948 | Sweden | 237/60 |
| 1,506,635 | 10/1969 | Germany | 244/117 A |

*Primary Examiner*—Albert W. Davis, Jr.
*Attorney, Agent, or Firm*—Howard J. Osborn; Wallace J. Nelson; John R. Manning

[57] ABSTRACT

A heat exchange system includes a reservoir for a liquid coolant, a conduit for conveying coolant from the reservoir through a heating zone, and a device, such as a check valve, for preventing reverse flow in the conduit in a direction opposite to the flow of coolant from the reservoir through the heating zone. Heat applied at the heating zone causes localized boiling of the coolant which causes the coolant to move in the conduit. The check valve prevents motion in one direction and thus the coolant flows in a desired direction in the conduit from the reservoir to and through the heating zone. The heating zone may be a surface, such as an aircraft wing leading edge, which is to be cooled. The heated liquid leaves the heating zone through a further conduit and thus removes heat from the heating zone. The heated liquid may be cooled and then returned to the reservoir for further use in the system. The heated liquid may be cooled in any convenient way. In an aircraft, the heated coolant may be passed in heat exchange with the aircraft fuel.

1 Claim, 3 Drawing Figures

HEAT EXCHANGER SYSTEM AND METHOD

ORIGIN OF THE INVENTION

The invention described herein was made by an employee of the U.S. Government and may be manufactured and used by or for the Government for governmental purposes without the payment of any royalties thereon or therefor.

This is a division of application Ser. No. 301,419, filed Oct. 27, 1972, now abandoned.

BACKGROUND OF THE INVENTION

This invention relates to a heat exchange system. More particularly, the invention relates to a heat exchange system wherein a coolant liquid is induced to flow through a heated zone without the use of a pump to move the coolant liquid. In one aspect, the invention relates to a heat exchanger system for aircraft. In another aspect, the invention relates to a heat exchanger system for hypersonic aircraft.

While there are a great many types of heat exchangers, which utilize a coolant liquid, most require a pump or other power source to move the coolant through the system. One type of heat exchanger, namely a heat pipe, operates without a pump. However, a heat pipe depends on capillary action and thus requires the use of relatively constricted passages. Furthermore, operation of a heat pipe system is sensitive to the orientation of gravity or accelleration forces.

It is an object of the present invention to provide a heat exchanger system including a liquid coolant which is moved without a pump. It is a further object to provide such a system which overcomes the disadvantages mentioned above which are inherent in pumpless systems known heretofore.

BRIEF SUMMARY OF THE INVENTION

The foregoing and other objects which will be apparent to those of ordinary skill in the art are achieved according to the present invention by providing a heat exchanger system including a reservoir for liquid coolant, conduit means for conveying liquid coolant from the reservoir through a heating zone, and means for preventing reverse flow of the liquid in the conduit means in a direction opposite to the flow therein from the reservoir through the heating zone.

DETAILED DESCRIPTION

Figure 1:
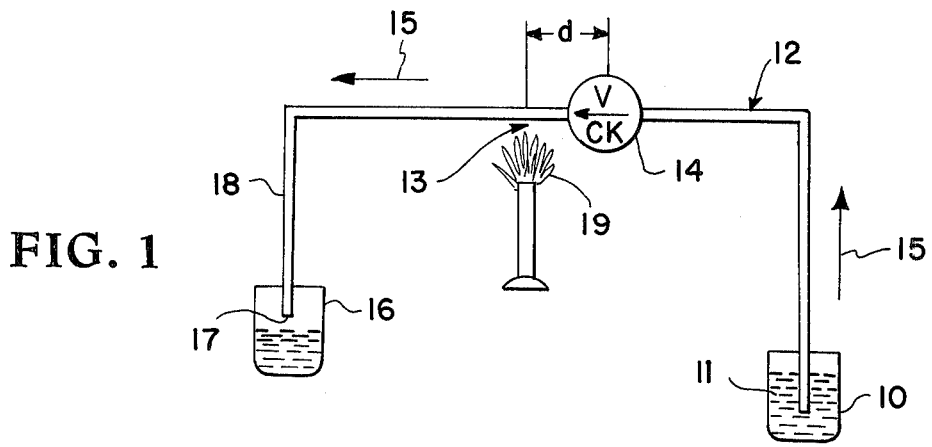
FIG. 1 is a diagrammatic view of a heat exchanger system according to the invention.

With reference to FIG. 1, a heat exchanger system according to the present invention includes a reservoir 10 for liquid coolant 11, a conduit 12 for conveying liquid coolant from reservoir 10 to a heating zone 13 and a check valve 14 for preventing flow of liquid in conduit 12 in a direction opposite to the flow therein of liquid coolant in the direction of arrow 15 from reservoir 10 through heating zone 13. In the embodiment illustrated in FIG. 1, the coolant 11 is a liquid such as water, freon, or the like, supplied from reservoir 10. Conduit 12 conveys the coolant liquid from reservoir 10 to and through heating zone 13 and a collection vessel 16 is disposed adjacent the outlet end 17 of conduit section 18 extending from heating zone 13 to collection vessel 16. Check valve 14 is positioned upstream of heating zone 13 between heating zone 13 and reservoir 10. Heat, in the form of a gas flame 19, is applied to conduit 12 at heating zone 13. The heat, of course, can be applied in any convenient manner such as by electric heater.

There are several phenomenon taking place within tube 12 and when all are combined they produce the single action of transporting heat and liquid through the tube in the direction of arrow 15. In FIG. 1, heat is applied to the tube at heating zone 13 in a relatively rapid manner. The mechanism of the ensuing process in the liquid can be termed as nucleate boiling combined with film boiling. Krieth describes a process similar to this one as "heat transfer to a subcooled boiling liquid" or simply "surface boiling". Actually, the present process could be more accurately termed "intense surface boiling". Where small diameter tubes are used for the present invention, the localized boiling is discrete. That is, although a multiplicity of small bubbles may initially and spontaneously occur with the application of heat, these all coalesce into a single larger bubble which fills the entire diameter of the tube. Several large bubbles are hindered from forming by the tube size. The single bubble then grows larger due to film boiling. The net result being that while the bubble is forming and enlarging the pressure on the liquid correspondingly increases. The bubble then exerts a force on the liquid in both directions of the tube. But because the check valve 14 hinders the motion of the liquid to the right in the sense of FIG. 1, the expanding bubble sets into motion the fluid to the left. This latter liquid, thus, receives an impulse from the bubble. As in the case described by Kreith, the inertia of the fluid subsequently further expands the bubble. Continued motion of the fluid to the left expands the bubble's volume and lowers the pressure on the liquid to the right below that pressure normally maintained on the check valve. As a result, the check valve is caused to open allowing the onrush of cooler fluid into the heated area. The combined result of the motions of the two liquids on each side of the bubble sweeps the bubble to the left into the cooler region of the tube. The resulting cooler environment now surrounding the whole bubble rapidly collapses the bubble with a corresponding further reduction in fluid pressure. With the mass of liquid to the left of the heated area still in motion, the drop in pressure pumps more liquid from the right hand side until the lower pressure condition is satisfied. The period of the first cycle thus terminates. The cooler liquid from the right cools portions of the tube heated by the condensing bubble and prepares the tube for the next cycle. The cycle period depends upon fluid properties, tube diameter and length, tube and check valve frictions, check valve constant, rate of heat transfer to the fluid, the fluid dynamics of the system and on the reservoir pressure.

The cycle under which the device operates resembles in part the regenerative cycles of Stirling or Ericcson. Regeneration takes place in that portion of the tube heated by the condensing bubble. Cool liquid then flows over the area uncooled by the bubble and becomes warmer. Thus, some heat of the collapsing bubble is transferred to the proceeding cycle. Consequently, boiling of the liquid can be at a faster rate.

Because fluid motion is present, the point of heat application can have a large bearing upon the frequency of operation or of the pulses. By properly locating the heating zone 13 at a distance d, see FIG. 1, from check valve 14 this frequency can be markedly affected. That is, a so-called resonant point can be found which greatly increases the cycle frequency. This point naturally is a function of the fluid properties, of the apparatus design, and of the manner of heat application. It has been possible to increase to ten fold the normal cycle period by applying heat at a resonant point. That condition which represents greatest cycle frequency undoubtedly represents an operating condition where maximum regeneration is taking place and thus, the condition of maximum thermodynamic cycle efficiency. Regeneration is not completely effective unless some reverse motion of the fluid is present as can be caused by a returning pressure wave traveling to the righthand side of the tube. This wave simultaneously moves the regeneratively heated or preheated liquid back over the externally heated tube area and closes the check valve. By heating a larger tube area resonance disappears and the otherwise normal cycle frequency becomes lower until such a point is reached where all fluid motion ceases. Such a condition can cause damage to the tube if heating continues.

The check valve may be located either upstream or downstream of the heating zone and, since the liquid is incompressible, its precise location is not critical. In a preferred system, however, two check valves are used, one upstream and one downstream. Where a single check valve is used, upstream location is preferred.

Figure 2:
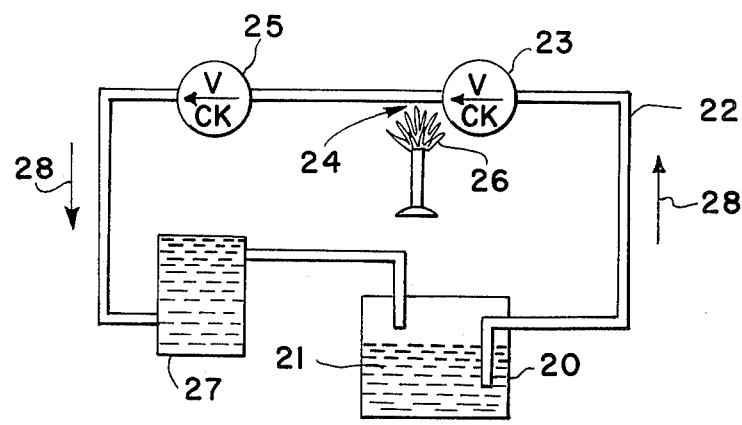
FIG. 2 is a diagrammatic view of an alternative embodiment of the invention.

While the embodiment of FIG. 1 is an open system, the system can be closed into a closed loop through which the coolant liquid circulates. In that event, the pressure on the liquid in the reservoir is regulated in any convenient manner. This is illustrated in the embodiment of FIG. 2, which includes reservoir 20 supplies liquid coolant 21 for conduit 22 through a first check valve 23, heating zone 24, and a second check valve 25. Heat is provided at heating zone 24 located between the check valves by gas flame 26. A cooler, in this case an air cooled cooling unit 27 is located in conduit 22 downstream of check valve 25. Coolant flow in the closed loop is in the direction of arrows 28. Operation of the closed loop system is similar to the open system of FIG. 1 except that changes in the location of heating zone 24 has a generally less effect.

Figure 3:
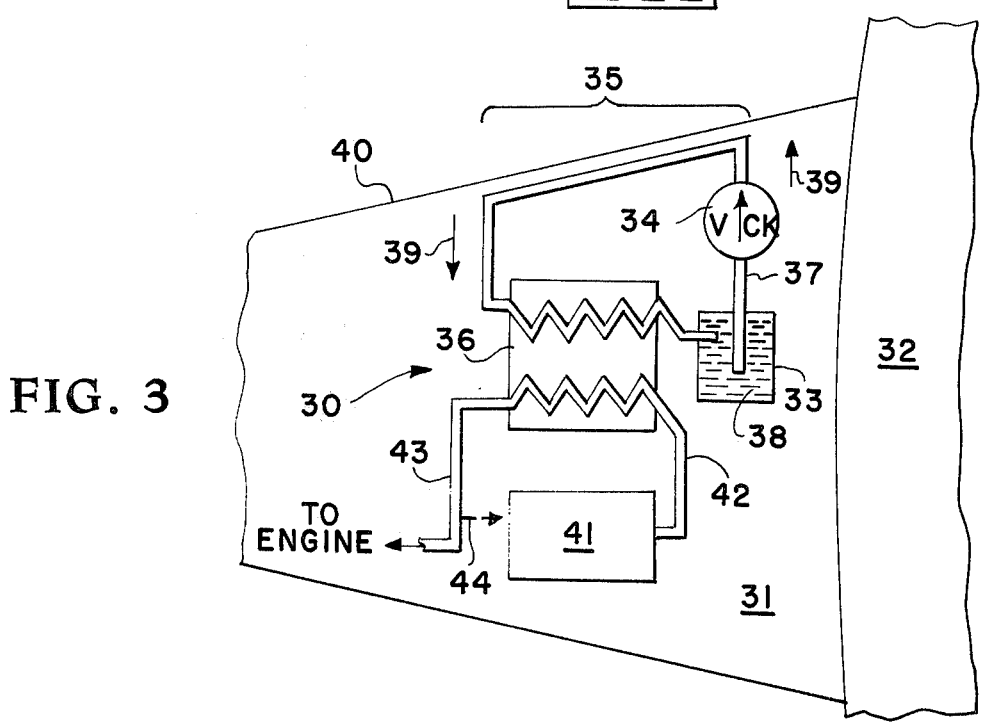
FIG. 3 is a diagrammatic plan view of a portion of an aircraft showing a heat exchanger system according to the present invention provided in the wing of the aircraft.

One application of the invention is illustrated in FIG. 3. A heat exchanger system 30 according to the invention is located in the wing 31 of a hypersonic aircraft 32, portions only being shown in FIG. 3. Heat exchanger system 30 includes a reservoir 33, check valve 34, heating zone 35, cooler 36, and conduit 37 forming a closed loop for flow of liquid coolant 38, in this case a water-glycol solution, in the direction of arrows 39. Heating zone 35 is adjacent the leading edge 40 of wing 31. The leading edge 40 of wing 31 becomes heated during flight of the hypersonic aircraft due to aerodynamic heating. The heat is applied to that portion of conduit 37 adjacent the wing leading edge and the heat causes motion of the liquid coolant in the system loop as in the embodiment of FIG. 2. Heat is thus carried away from the wing leading edge. The device is self-regulating in that a higher heating rate increases the coolant flow rate. Pumping occurs after the local fluid temperature in contact with the hot surface exceeds its boiling point. Once this occurs, the accompanying pressure rise and the check valve operation cause the fluid to flow and new cooler fluid is then in contact with the hot surface. The heated fluid which has been partially vaporized moves into a region of colder surroundings and the vapor bubbles condense.

A cooling unit 36 is also provided in the coolant flow path. In this case, the heat exchanger is a conventional indirect heat exchanger in which the heated coolant passes in heat exchanger with the aircraft fuel. Fuel tank 41 is provided with a conduit 42 for supplying cool fuel to heat exchanger 36 and a conduit 43 is provided for conveying heated fuel away from heat exchanger 36. Heated fuel in conduit 43 may be passed to the aircraft engine as shown or to reservoir 41. Alternatively, some of the heated fuel may be delivered to the aircraft engine and some returned to the fuel tank by a conduit 44 shown in dashed lines in FIG. 3.

While use of the invention has been illustrated in connection with a hypersonic aircraft, it will be apparent that many other applications are feasible. For example, the system can be used for the extraction of heat from nuclear reactors and in other applications where heat pipes are feasible. Furthermore, the system may be used as a prime mover electric power station and in vehicles of various types including water craft and land vehicles. The invention actually operates according to a Rankine cycle and by monitoring the temperatures and pressures during a cycle, the cycle efficiency can be determined.

In comparing this invention to the heat pipe, the invention operating as a passive device can operate over the same temperature limits as a heat pipe. However, the capacity of the present device is greater for the same diameters considered, because the impulse tube is not limited to the pumping capacity of a dense wick as is a heat pipe. Overloading the present invention only tends to increase its heat transfer capability. Further, because in the present device a supply and return line may be used (in a closed system) all effects of gravity are virtually eliminated. The effects of gravity on one line is cancelled by the same effects on the other line. Also, the length of tube lines can be much greater for the present invention than for a heat pipe because the losses experienced by liquid flowing through the interstices of a wick in the heat pipe are absent.

In regard to a prime mover like an internal combustion or steam engine, the obvious advantage of the present invention is the small number of moving parts used in the impulse tube. Thus, construction of the present device is much simpler and cheaper. Also, less weight is associated with the present invention.

Although the invention has been described relative to a particular embodiment thereof, there are obviously numerous variations and modifications readily apparent to those skilled in the art in the light of the above teachings. It is therefore to be understood that the invention may be practiced otherwise than as specifically described.

What is claimed as new and desired to be secured by Letters Patent of the United States is:

1. The combination of an aircraft and a heat exchanger system for the aircraft comprising:
   a first reservoir for liquid coolant;
   conduit means for conveying liquid coolant from said reservoir through a heating zone;
   said heating zone comprising a leading edge of an airfoil surface on said aircraft, means for preventing reverse flow of said liquid in said conduit means in a direction opposite to the flow therein from said first reservoir through said heating zone, further conduit means for conveying said liquid coolant from said heating zone to said first reservoir and forming, with said first reservoir and the first mentioned conduit means a closed loop for circulation of said liquid coolant, cooling means located downstream of said heating zone for cooling heated liquid coolant prior to returning same to said heating zone, said cooling means comprising a cooling unit through which the portion of the conduit means carrying the heated liquid passes before returning to said first reservoir, a fuel tank disposed in said aircraft, a fuel conduit leading from said fuel tank to the aircraft engine, and said fuel conduit leading through said cooling unit and extending adjacent to the conduit means carrying the heated liquid, whereby heat from the heated fluid is transferred to the fuel in said fuel conduit within said cooling unit.

* * * * *